US 11,670,818 B2

(12) United States Patent
White et al.

(10) Patent No.: US 11,670,818 B2
(45) Date of Patent: Jun. 6, 2023

(54) SERVICEABLE BATTERY PACK ASSEMBLY

(71) Applicant: GM GLOBAL TECHNOLOGY OPERATIONS LLC, Detroit, MI (US)

(72) Inventors: Andrew W. White, Shelby Township, MI (US); Terry A. Swartzell, Ann Arbor, MI (US); James A. Rochon, Shelby Township, MI (US); Terry J. Short, Waterford, MI (US); Charles E. Jensen, Shelby Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 301 days.

(21) Appl. No.: 16/709,031

(22) Filed: Dec. 10, 2019

(65) Prior Publication Data
US 2021/0175480 A1    Jun. 10, 2021

(51) Int. Cl.
*H01M 50/209*    (2021.01)
*H01M 50/10*     (2021.01)

(52) U.S. Cl.
CPC ......... *H01M 50/209* (2021.01); *H01M 50/10* (2021.01)

(58) Field of Classification Search
CPC ......... H01M 50/20–209; H01M 50/10; H01M 50/249; B60K 2001/0438
See application file for complete search history.

(56) References Cited

U.S. PATENT DOCUMENTS

| | | |
|---|---|---|
| 2009/0050387 A1 | 2/2009 | Yustick et al. |
| 2010/0136402 A1* | 6/2010 | Hermann ............ H01M 50/276 |
| | | 429/185 |
| 2014/0158444 A1 | 6/2014 | Han et al. |
| 2014/0326524 A1 | 11/2014 | Ogushi et al. |
| 2018/0175430 A1* | 6/2018 | Modderno .......... H01M 8/2484 |
| 2018/0361874 A1 | 12/2018 | Kobayashi et al. |
| 2019/0051874 A1 | 2/2019 | Erb et al. |
| 2021/0050570 A1* | 2/2021 | Dunlap ............... H01M 50/249 |
| 2021/0098761 A1* | 4/2021 | Montgomery ...... H01M 50/244 |

FOREIGN PATENT DOCUMENTS

| | | |
|---|---|---|
| CN | 205609586 U | 9/2016 |
| CN | 208393092 U | 1/2019 |
| CN | 208797075 U | 4/2019 |

OTHER PUBLICATIONS

Chinese Office Action for Chinese Application No. 20201144838.1; Report dated Oct. 26, 2022 (pp. 1-12).

* cited by examiner

*Primary Examiner* — Cynthia H Kelly
*Assistant Examiner* — Niara Trant
(74) *Attorney, Agent, or Firm* — Cantor Colburn LLP

(57) ABSTRACT

An serviceable battery pack and assembly method may include a battery pack having a stanchion extending through a wall of the battery pack, a first battery pack seal between the stanchion and the wall of the battery pack, attachment of the battery pack at the exterior of a floor pan of a vehicle at the stanchion, and a second battery pack seal between the exterior of the floor pan and the wall of the battery pack surrounding the stanchion.

18 Claims, 5 Drawing Sheets

SERVICEABLE BATTERY PACK ASSEMBLY

INTRODUCTION

Battery electric vehicles, including pure electric and range extended versions, may deliver wheel torque through a variety of drive configurations. Such drive configurations may include motor-at-wheel and various motor/transmission architectures. Certain battery electric vehicle powertrain configurations do not require packaging volume beneath the vehicle passenger compartment for motor and driveline components. Such configurations advantageously utilize this free volume for packaging the electric batteries required for driving the traction motor(s) of the powertrain. Most, if not all, of the available space below the floor pan of a battery electric vehicle may be utilized as a battery pack bay.

Battery packs are desirably sealed to the outside environment to prevent water and dirt intrusion for example. However, battery packs are also desirably serviceable both during and after their useful life. Therefore, battery packs must be designed for service both in their integration with the vehicle structure and as independent subassemblies.

SUMMARY

In one exemplary embodiment, an attachment system for a serviceable battery pack may include a battery pack having a first enclosure wall with a respective inner side, and a respective outer side, and defining a respective opening therethrough. The system may include a stanchion having an interior portion inside the battery pack and a first exterior portion extending from the interior portion through the first enclosure wall opening to outside the battery pack, the interior portion including a first flange larger than the first enclosure wall opening. The stanchion further may have a first set of threads on the first exterior portion. The system further may include a first gasket trapped between the first flange and the inner side of the first enclosure wall, and a first nut engaging the first set of threads and configured to compress the first enclosure wall between the first nut and the first flange. The system additionally may include a battery pack attachment structure having a first surface facing the outer side of the first enclosure wall and defining a respective opening therethrough, the first enclosure wall opening and the battery pack attachment structure opening being substantially concentric. The system also may include a threaded attachment fastener configured to draw the stanchion and the battery pack attachment structure together, and a first seal disposed between the first enclosure wall and the battery pack attachment structure.

In addition to one or more of the features described herein, the first seal disposed between the first enclosure wall and the battery pack attachment structure may include a compressible gasket surrounding the first nut.

In addition to one or more of the features described herein, the battery pack may include a second enclosure wall opposite to and spaced from the first enclosure wall and having a respective inner side, a respective outer side and defining a respective opening therethrough. The stanchion may include a second exterior portion, the interior portion of the stanchion being intermediate the first and second exterior portions, the second exterior portion extending through the second enclosure wall opening to outside the battery pack, the interior portion may include a second flange larger than the second enclosure wall opening, and the stanchion may include a second set of threads on the second exterior portion. The system further may include a second gasket trapped between the second flange and the inner side of the second enclosure wall, and a second nut engaging the second set of threads and configured to compress the second enclosure wall between the second nut and the second flange.

In addition to one or more of the features described herein, the stanchion may include a bore through at least a part of the first exterior portion and a set of threads at the interior of the bore. The threaded attachment fastener may include a bolt extending through the battery pack attachment structure opening and engaging the set of threads at the interior of the bore to draw the stanchion and the battery pack attachment structure together.

In addition to one or more of the features described herein, the stanchion may include a bore through at least a part of the first exterior portion and a set of threads at the interior of the bore. The threaded attachment fastener may include a bolt extending through the battery pack attachment structure opening and engaging the set of threads at the interior of the bore to draw the stanchion and the battery pack attachment structure together.

In addition to one or more of the features described herein, the stanchion may include a first bore through at least a part of the first exterior portion and a first set of threads at the interior of the first bore, a second bore through at least a part of the second exterior portion and a second set of threads at the interior of the second bore. The threaded attachment fastener may include a first bolt extending through the battery pack attachment structure opening and engaging the first set of threads at the interior of the first bore to draw the stanchion and the battery pack attachment structure together. The system may include a second seal disposed between the outer side of the second enclosure wall and a washer, and a second bolt extending through the washer and the second enclosure wall opening and engaging the second set of threads at the interior of the second bore.

In addition to one or more of the features described herein, the stanchion may include a longitudinal bore therethrough, the threaded attachment fastener may include a bolt having a head and an opposite threaded end, the bolt inserted completely through the stanchion bore and battery pack attachment structure opening and terminating at a third nut.

In addition to one or more of the features described herein, the bolt may be inserted with the head proximate the second exterior portion of the stanchion, and the third nut proximate the first exterior portion of the stanchion.

In addition to one or more of the features described herein, the bolt may be inserted with the head proximate the first exterior portion of the stanchion, and the third nut proximate the second exterior portion of the stanchion.

In addition to one or more of the features described herein, the system may further include a second seal disposed between the outer side of the second enclosure wall and a washer with the washer disposed between the second seal and the head of the bolt.

In addition to one or more of the features described herein, the battery pack may include a second enclosure wall opposite to and spaced from the first enclosure wall and having a respective inner side, a respective outer side and defining a respective opening therethrough. The stanchion may extend from the first exterior portion at least to the second enclosure wall, the stanchion further may include a longitudinal bore therethrough substantially concentric with the second enclosure wall opening. The stanchion may be sealably affixed to the second enclosure wall, and the threaded attachment fastener may include a bolt having a head and an opposite threaded end, the bolt inserted completely through the stanchion bore, the battery pack attachment structure opening, the second enclosure wall opening, and terminating at a second nut.

In another exemplary embodiment, an attachment system for a serviceable battery pack may include a battery pack having an enclosure wall with an inner side, an outer side and defining a respective opening therethrough. The system may include a stanchion having an interior portion inside the battery pack and an exterior portion extending from the interior portion through the enclosure wall opening to outside the battery pack, the interior portion including a flange larger than the enclosure wall opening. The stanchion may include a first set of external threads on the exterior portion and a second set of threads. The system further may include a gasket trapped between the flange and the inner side of the enclosure wall, and a first nut engaging the first set of external threads and configured to compress the enclosure wall between the first nut and the flange. The system additionally may include a battery pack attachment structure having a first surface facing the outer side of the enclosure wall and defining a respective opening therethrough, the enclosure wall opening and the battery pack attachment structure opening being substantially concentric, a threaded attachment fastener engaging the second set of threads and configured to draw the stanchion and the battery pack attachment structure together, and a seal disposed between the enclosure wall and the battery pack attachment structure.

In addition to one or more of the features described herein, the stanchion may include a bore through at least a part of the exterior portion, the second set of threads including internal threads at the interior of the bore. The threaded attachment fastener may include a bolt extending through the battery pack attachment structure opening and engaging the second set of threads to draw the stanchion and the battery pack attachment structure together.

In addition to one or more of the features described herein, the seal disposed between the enclosure wall and the battery pack attachment structure may include a compressible gasket surrounding the first nut.

In addition to one or more of the features described herein, the exterior portion of the stanchion further may have a part extending through the battery pack attachment structure opening, the second set of threads may include a portion of the first set of external threads on the part of the exterior portion extending through the battery pack attachment structure opening, and the threaded attachment fastener may include a second nut engaging the second set of threads and configured to compress the battery pack attachment structure between the second nut and the first nut.

In addition to one or more of the features described herein, the exterior portion of the stanchion further may have a part extending through the battery pack attachment structure opening, and the part of the exterior portion extending through the battery pack attachment structure opening may include a stepped diameter providing a shoulder. The second set of threads may include a second set of external threads on the part of the exterior portion extending through the battery pack attachment structure opening. The threaded attachment fastener may include a second nut engaging the second set of threads and configured to compress the battery pack attachment structure between the second nut and the shoulder.

In another exemplary embodiment, an assembly method for a serviceable battery pack may include providing a battery pack including a stanchion extending through a wall of the battery pack, providing a first battery pack seal between the stanchion and the wall of the battery pack, attaching the battery pack at the exterior of a floor pan of a vehicle at the stanchion, and providing a second battery pack seal between the exterior of the floor pan and the wall of the battery pack surrounding the stanchion.

In addition to one or more of the features described herein, providing the first battery pack seal between the stanchion and the wall of the battery pack may include providing the stanchion including a shoulder inside the battery pack, providing external threads on a part of the stanchion outside the battery pack, and compressing the wall of the battery pack toward the shoulder with a nut engaging with the external threads.

In addition to one or more of the features described herein, attaching the battery pack at the exterior of the floor pan of the vehicle at the stanchion may include providing the stanchion including a bore through at least a part of the stanchion extending through the wall of the battery pack, providing internal threads at the interior of the bore, and providing a bolt extending through the floor pan of the vehicle and engaging with the internal threads.

In addition to one or more of the features described herein, attaching the battery pack at the exterior of the floor pan of the vehicle at the stanchion may include providing the stanchion including a bore through at least a part of the stanchion extending through the wall of the battery pack, providing internal threads at the interior of the bore, and providing a bolt extending through the floor pan of the vehicle and engaging with the internal threads. Providing the second battery pack seal between the exterior of the floor pan and the wall of the battery pack surrounding the stanchion may include providing a compressible gasket between the exterior of the floor pan and the wall of the battery pack surrounding the nut, and compressing the compressible gasket between the exterior of the floor pan and the wall of the battery pack surrounding the nut with the bolt extending through the floor pan of the vehicle and engaging with the internal threads.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
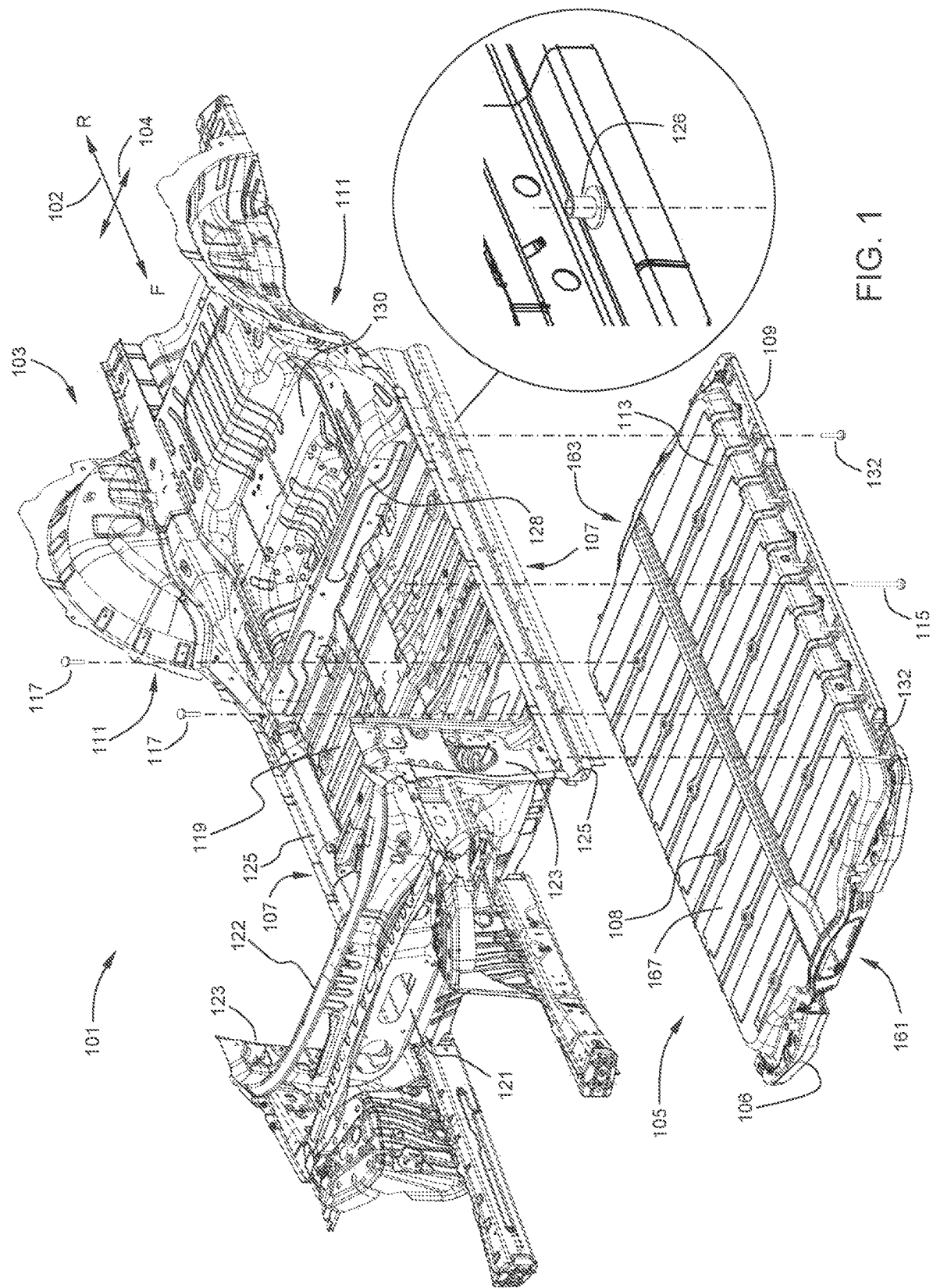
FIG. 1 illustrates an exemplary unibody structure and an exemplary battery pack for a battery electric vehicle, in accordance with the present disclosure.

The following description is merely exemplary in nature and is not intended to limit the present disclosure, its application or uses. Throughout the drawings, corresponding reference numerals indicate like or corresponding parts and features.

FIG. 1 illustrates an exemplary unibody structure and exemplary first battery pack for a battery electric vehicle 101. A partial isometric view of an automotive unibody structure 103 is illustrated relative to longitudinal and lateral axes, 102,104 respectively, with the front and rear of the vehicle designated as F and R, respectively. Windshield cross member 122 extends substantially laterally between the tops of left and right front door hinge pillars 123. A dash panel 121 extends substantially laterally along the lower extent of the windshield cross member 122 between the left and right front door hinge pillars 123. The front door hinge pillars 123 extend upwardly from the front of a respective rocker assembly 107 which may include an elongated inner rocker panel 125 and an elongated outer rocker closeout panel (not shown). The rocker assemblies 107 extend rearwardly, substantially in parallel, from the base of the respective front door hinge pillars 123 and may terminate substantially at respective rear wheel well closeout panels 111. Floor pan 119 may span laterally between the rocker assemblies 107 and longitudinally between the dash panel 121 to a rear waterfall member 128 which may rise from the floor pan 119 to a rear seat pan 130. As used herein, floor pan may refer to either or both floor pan 119 and rear seat pan 130. The Rear waterfall member 128 may span substantially laterally between the rocker assemblies 107 toward the rear thereof and forward of the rear wheel well closeouts panels 111. An area generally beneath the floor pan 119 and between the rocker assemblies 107 provides lateral space for a battery pack. Longitudinal space for a battery pack may be provided substantially along the entire length of the rocker assemblies 107. The lateral limits of the battery pack bay may be defined by the design dimensioning between the rocker assemblies 107. The longitudinal limits of the battery pack bay may be substantially limited by the length of the rocker assemblies 107 since, in accordance with the present disclosure, they provide the lateral attachment points for a battery pack. Alternatively or additionally, the longitudinal limits of the battery pack bay may be substantially limited by hard physical stops of lateral vehicle structure defining limits of available space beneath the vehicle for a battery bay. Alternatively or additionally, the longitudinal limits of the battery may be primarily driven by limits established by other design considerations. Regardless, for the purpose of the present disclosure, it is assumed that the battery bay is established longitudinally between predefined front and rear limits. The space available for a battery pack may be referred to herein as a battery pack bay.

An exemplary battery pack 105 may include a lower tray 106 and upper cover 113. Upper cover 113 forms one wall 167 of the battery pack opposing an opposite wall 265 (FIG. 2) formed by lower tray 106. The battery pack 105 may house a plurality of modular battery enclosures in a sealed but serviceable manner. The lower tray 106 may be sealably coupled to the upper cover 113 around the entire perimeter of the battery pack 105. An outer lip 109 may extend around the perimeter of the battery pack 105 and provide an area outside of the sealed interface between the lower tray 106 and upper cover 113 for a plurality of mounting openings through which mounting hardware such as bolts 132 may provide structural engagement of the battery pack 105 to the automotive unibody structure 103 within the battery pack bay. In one embodiment, a plurality of bolts secure the battery pack 105 to the inner rocker panels 125 of rocker assemblies 107 via a complementary number of weld nuts 126 as shown in the inset detail of FIG. 1. Battery pack 105 may include one or more mounting provisions 108 such as threaded receivers to which bolts 117 engage through the floor pan 119 to further structurally secure the battery pack 105 to the automotive unibody structure 103. Additionally or alternatively, the battery pack 105 may include one or more mounting provisions 108 for passing bolts 115 through from below to engage fasteners such as weld nuts on the upper side of the floor pan 119. The battery pack 105 may be considered a full-size battery pack assuming it occupies substantially the entirety of the battery pack bay between the front and rear limits. It can be appreciated that the battery pack 105 has longitudinally opposite front and rear ends 161 and 163 which correspond to the front and rear limits, respectively, of the battery pack bay.

Figure 2:
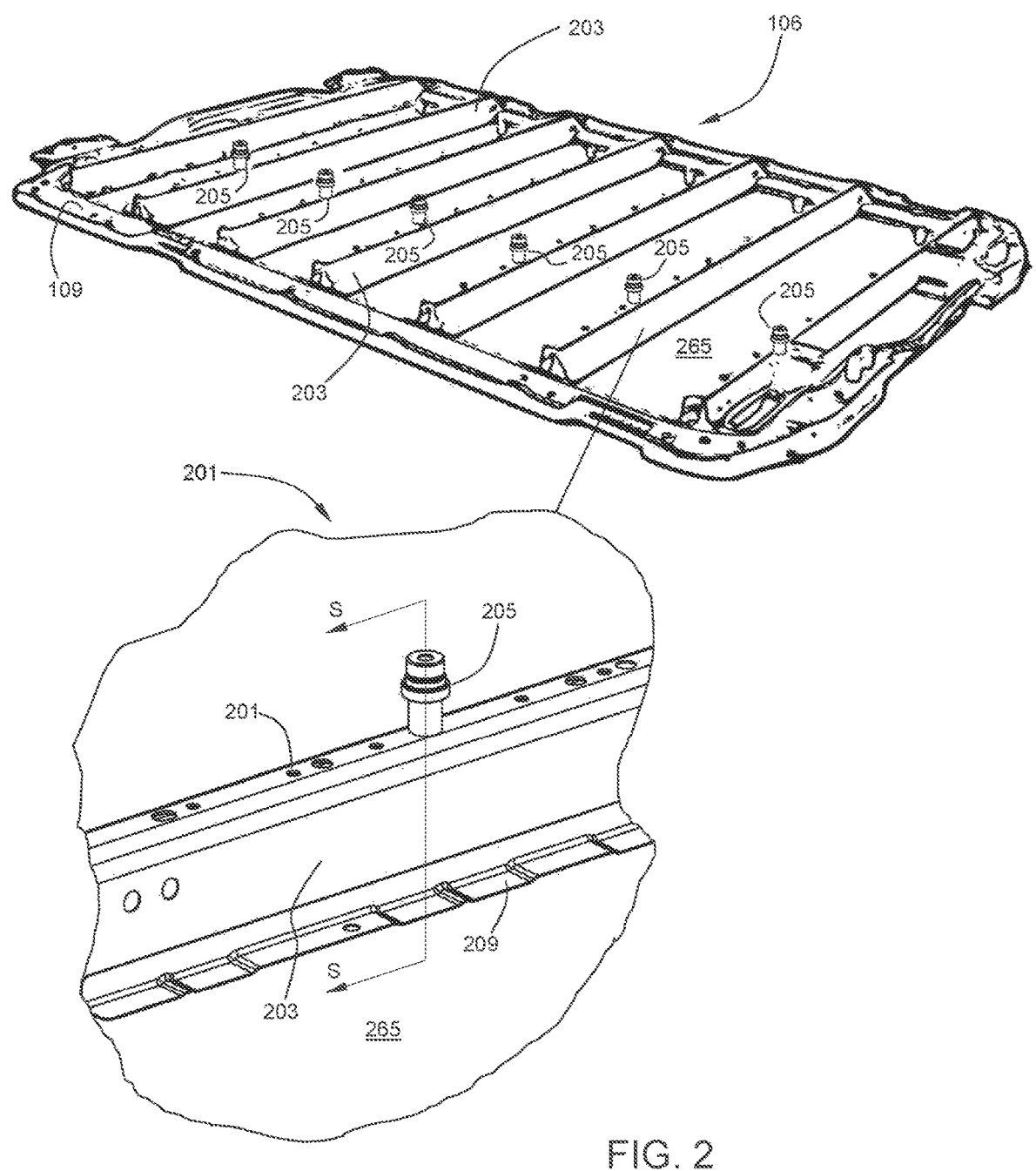
FIG. 2 illustrates a tray of the exemplary battery pack including structural rails and mounting stanchions, in accordance with the present disclosure.

FIG. 2 illustrates the lower tray 106 of the exemplary battery pack 105 including interior structural rails 203 and mounting stanchions 205, in accordance with the present disclosure. A plurality of modular battery enclosures (not shown) may be provided between the structural rails 203 in a number and arrangement to meet the desired energy density objectives of the battery pack and, in application to a battery electric vehicle, range objectives of the vehicle. While the battery pack 105 may include attachment means such as bolts around the perimeter at the lip 109 for structurally securing the battery pack 105 to the rocker assemblies 107 (FIG. 1), attachments may also be made to the floor pan 119 (FIG. 1) at the stanchions 205 as described herein. Structural rails 203 may include a cap 201 and a base 209 secured to the lower wall 265 such as by welding. Stanchions 205 may be fixed to the structural rails 203, to the lower tray 106, or to both. In one embodiment, materials for the battery pack 105 and described components may be steel. Fixing of battery pack components may be by way of welding where permanent affixing is desired.

Figure 3A:
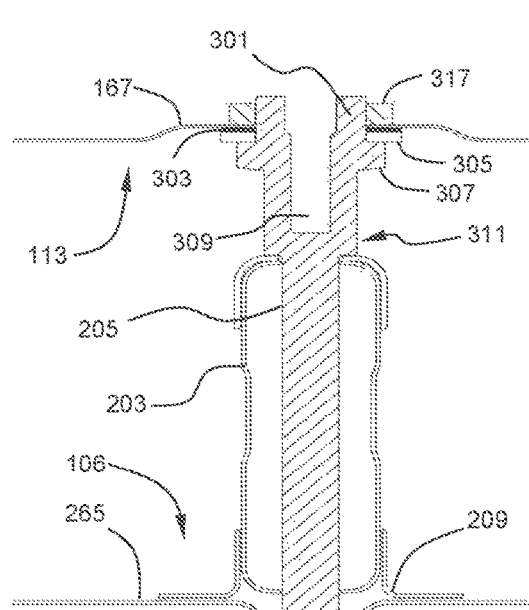
FIGS. 3A and 3B illustrate sectional views through a portion of an exemplary mounting stanchion and structural rail, in accordance with the present disclosure.
Figure 3B:
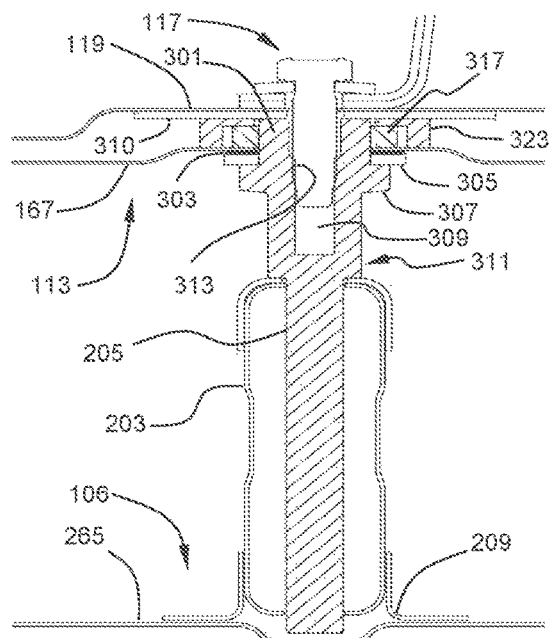

FIGS. 3A and 3B illustrate sectional views through a portion of an exemplary mounting stanchion and structural rail substantially along a longitudinal axis as indicated by line S-S in FIG. 2. All section illustrations in FIGS. 4-8 are understood to correspond to similar orientations. FIG. 3A is illustrative of one embodiment of a stanchion 205 and its attachment and seal to wall 167 formed in upper cover 113 of battery pack 105. Wall 167 may include local reinforcement as required as disclosed herein with respect to FIGS. 3B, 4 and 5. Structural rail 203 including base 209 may be secured to the wall 265 formed in lower tray 106. Stanchion 205 may extend through structural rail 203 and may be welded thereto. An interior portion 311 of the stanchion 205 is within the battery pack beneath wall 167. An exterior portion 301 of the stanchion 205 extends from the interior portion 311 through an opening in the wall 167. The exterior portion 301 may include a bore 309 partially therethrough and include internal threads for receiving an attachment bolt as further described herein in conjunction with FIG. 3B. The stanchion 205 may include a flange 307 sized larger than the opening in the wall 167. A washer 305 and gasket 303 may be captured between the flange 307 and the inner side of wall 167. Exterior portion 301 of stanchion 205 may include exterior threads for engaging nut 317. Nut 317 may be tightened to draw the wall 167 and stanchion together thereby compressing the wall 167 and the washer 305 and gasket 303 between the nut 317 and flange 307. A thread seal may be used at the nut 317 to exterior thread interface to prevent loosening and to seal any gas or liquid intrusions at the interface. Such arrangement provides a seal of the interior of the battery pack 105 from the exterior thereof. Moreover, the assembly process may be readily reversed in the future when servicing the battery pack 105 is desired, for example at the end of useful life of the battery pack 105 or when the modular battery enclosures within the battery pack 105 are refreshed with new units during the service life of the battery electric vehicle. As is commonly practiced by vehicle original equipment manufacturers, the final assembly of vehicle may include receiving sub-assembled modules within the assembly plant for final assembly to the vehicles being produced. It is envisioned that the battery pack 105 as described herein may be manufactured off-site and received at the final assembly plant for integration with the battery electric vehicle. As such, it can be appreciated that the stanchion and seal assembly described herein enables final assembly and sealing of the battery pack which may be leak checked and tested, such as by pressure checking a completed battery pack, at the place of battery pack manufacture and assembly.

FIG. 3B is illustrative of the embodiment of stanchion 205 and its attachment and seal to wall 167 formed in upper cover 113 of battery pack 105 as shown in FIG. 3A and described herein. FIG. 3B additionally illustrates an embodiment of attachment of the battery pack 105 so constructed to a battery pack attachment structure, for example to the automotive unibody structure 103 of the battery electric vehicle 101 as described herein. In one embodiment, the battery pack attachment structure may include the floor pan 119 of the automotive unibody structure 103. The floor pan may include an opening therethrough which, in assembly alignment, is substantially concentric with the opening in the wall 167 of the upper cover 113 of battery pack 105. Floor pan 119 may additionally include local reinforcement 310, for example steel sheet stock welded to the floor pan 119 utilizing weld-through expandable sealer. Any such reinforcement 310 is understood to be included in any reference to floor pan 119. In the present embodiment, the floor pan 119 bears against the end of exterior portion 301 of the stanchion 205. A seal may be provided between the floor pan 119 and the wall 167. The seal may be a compressible seal such as a gasket 323 as illustrated. The seal may be any other suitable seal including, for example a dispensed flexible polyurethane elastomer which is cured in place after assembly of the battery pack 105 to the floor pan 119. Such a secondary seal provides additional sealing of the battery pack 105 from the undesirable outside environmental contaminants which may be particularly aggressive in an automotive underbody environment. Bolt 117 may be engaged with interior threads 313 within bore 309 and tightened to draw the structures together and compress gasket 323 to effect the desired seal.

Figure 4:
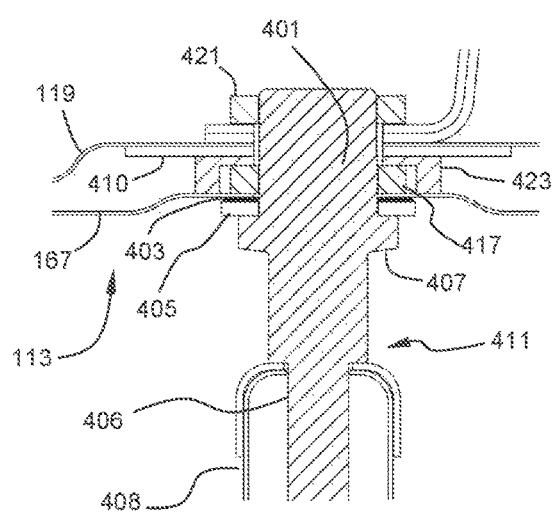
FIG. 4 illustrates a sectional view through a portion of an exemplary mounting stanchion and structural rail, in accordance with the present disclosure.

FIG. 4 illustrates an alternate embodiment of a stanchion 406 and its attachment and seal to wall 167 formed in upper cover 113 of battery pack 105. Stanchion 406 may extend through structural rail 408 and may be welded thereto. An interior portion 411 of the stanchion 406 is within the battery pack beneath wall 167. An exterior portion 401 of the stanchion 406 extends from the interior portion 411 through an opening in the wall 167. The exterior portion 401 may include external threads for engaging a nut as further described herein. The stanchion 406 may include a flange 407 sized larger than the opening in the wall 167. A washer 405 and gasket 403 may be captured between the flange 407 and the inner side of wall 167. Exterior portion 401 of stanchion 406 may include exterior threads for engaging nut 417. Nut 417 may be tightened to draw the wall 167 and stanchion 406 together thereby compressing the wall 167 and the washer 405 and gasket 403 between the nut 417 and flange 407. A thread seal may be used at the nut 417 to exterior thread interface to prevent loosening and to seal any gas or liquid intrusions at the interface. Such arrangement provides a seal of the interior of the battery pack 105 from the exterior thereof. Moreover, the assembly process may be readily reversed in the future when servicing the battery pack 105 is desired, for example at the end of useful life of the battery pack 105 or when the modular battery enclosures within the battery pack 105 are refreshed with new units during the service life of the battery electric vehicle. As is commonly practiced by vehicle original equipment manufacturers, the final assembly of vehicle may include receiving sub-assembled modules within the assembly plant for final assembly to the vehicles being produced. It is envisioned that the battery pack 105 as described herein may be manufactured off-site and received at the final assembly plant for integration with the battery electric vehicle. As such, it can be appreciated that the stanchion and seal assembly described herein enables final assembly and sealing of the battery pack which may be leak checked and tested, such as by pressure checking a completed battery pack, at the place of battery pack manufacture and assembly.

Figure 5:
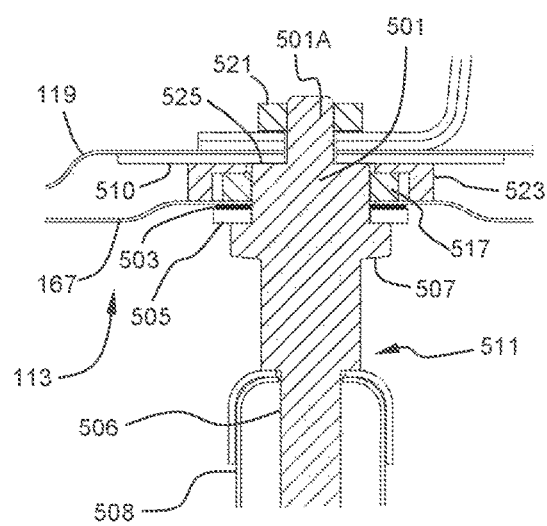
FIG. 5 illustrates a sectional view through a portion of an exemplary mounting stanchion and structural rail, in accordance with the present disclosure.

FIG. 4 additionally illustrates an embodiment of attachment of the battery pack 105 so constructed to a battery pack attachment structure, for example to the automotive unibody structure 103 of the battery electric vehicle 101 as described herein. The battery pack attachment structure may include the floor pan 119 of the automotive unibody structure 103. The floor pan 119 may include an opening therethrough which in assembly alignment is substantially concentric with the opening in the wall 167 of the upper cover 113 of battery pack 105. Floor pan 119 may additionally include local reinforcement 410, for example steel sheet stock welded to the floor pan 119 utilizing weld-through expandable sealer. Any such reinforcement 410 is understood to be included in any reference to floor pan 119. In the present embodiment, the opening in floor pan 119 is sized to pass the exterior portion 401 of the stanchion 406 therethrough. A seal may be provided between the floor pan 119 and the wall 167. The seal may be a compressible seal such as a gasket 423 as illustrated. The seal may be any other suitable seal including, for example a dispensed flexible polyurethane elastomer which is cured in place after assembly of the battery pack 105 to the floor pan 119. Such a secondary seal provides additional sealing of the battery pack 105 from the undesirable outside environmental contaminants which may be particularly aggressive in an automotive underbody environment. The exterior portion 401 may include external threads that extend through the opening in floor pan 119 which are engaged by nut 421 and tightened to draw the structures together and compress gasket 423 to effect the desired seal FIG. 5 illustrates an alternate embodiment of a stanchion 506 and its attachment and seal to wall 167 formed in upper cover 113 of battery pack 105. Stanchion 506 may extend through structural rail 508 and may be welded thereto. An interior portion 511 of the stanchion 506 is within the battery pack beneath wall 167. An exterior portion 501 of the stanchion 506 extends from the interior portion 511 through an opening in the wall 167. The exterior portion 501 may include external threads for engaging a nut as further described herein. The stanchion 506 may include a flange 507 sized larger than the opening in the wall 167. A washer 505 and gasket 503 may be captured between the flange 507 and the inner side of wall 167. Exterior portion 501 of stanchion 506 may include exterior threads for engaging nut 517. Nut 517 may be tightened to draw the wall 167 and stanchion together thereby compressing the wall 167 and the washer 505 and gasket 503 between the nut 517 and flange 507. A thread seal may be used at the nut 517 to exterior thread interface to prevent loosening and to seal any gas or liquid intrusions at the interface. Such arrangement provides a seal of the interior of the battery pack 105 from the exterior thereof. Moreover, the assembly process may be readily reversed in the future when servicing the battery pack 105 is desired, for example at the end of useful life of the battery pack 105 or when the modular battery enclosures within the battery pack 105 are refreshed with new units during the service life of the battery electric vehicle. As is commonly practiced by vehicle original equipment manufacturers, the final assembly of vehicle may include receiving sub-assembled modules within the assembly plant for final assembly to the vehicles being produced. It is envisioned that the battery pack 105 as described herein may be manufactured off-site and received at the final assembly plant for integration with the battery electric vehicle. As such, it can be appreciated that the stanchion and seal assembly described herein enables final assembly and sealing of the battery pack which may be leak checked and tested, such as by pressure checking a completed battery pack, at the place of battery pack manufacture and assembly.

FIG. 5 additionally illustrates an embodiment of attachment of the battery pack 105, so constructed, to a battery pack attachment structure, for example to the automotive unibody structure 103 of the battery electric vehicle 101 as described herein. The battery pack attachment structure may include the floor pan 119 of the automotive unibody structure 103. The floor pan 119 may include an opening therethrough which in assembly alignment is substantially concentric with the opening in the wall 167 of the upper cover 113 of battery pack 105. Floor pan 119 may additionally include local reinforcement 510, for example steel sheet stock welded to the floor pan 119 utilizing weld-through expandable sealer. Any such reinforcement 510 is understood to be included in any reference to floor pan 119. Exterior portion 501 of the stanchion 506 has a reduced diameter portion 501A and shoulder 525. In the present embodiment, the opening in floor pan 119 is sized to pass the reduced diameter portion 501A of exterior portion 501 of stanchion 506 therethrough. A seal may be provided between the floor pan 119 and the wall 167. The seal may be a compressible seal such as a gasket 523 as illustrated. The seal may be any other suitable seal including, for example a dispensed flexible polyurethane elastomer which is cured in place after assembly of the battery pack 105 to the floor pan 119. Such a secondary seal provides additional sealing of the battery pack 105 from the undesirable outside environmental contaminants which may be particularly aggressive in an automotive underbody environment. The reduced diameter portion 501A of exterior portion 501 of stanchion 506 may include external threads that extend through the opening in floor pan 119 which are engaged by nut 521 and tightened to draw the structures together and compress gasket 523 to effect the desired seal.

Figure 6:
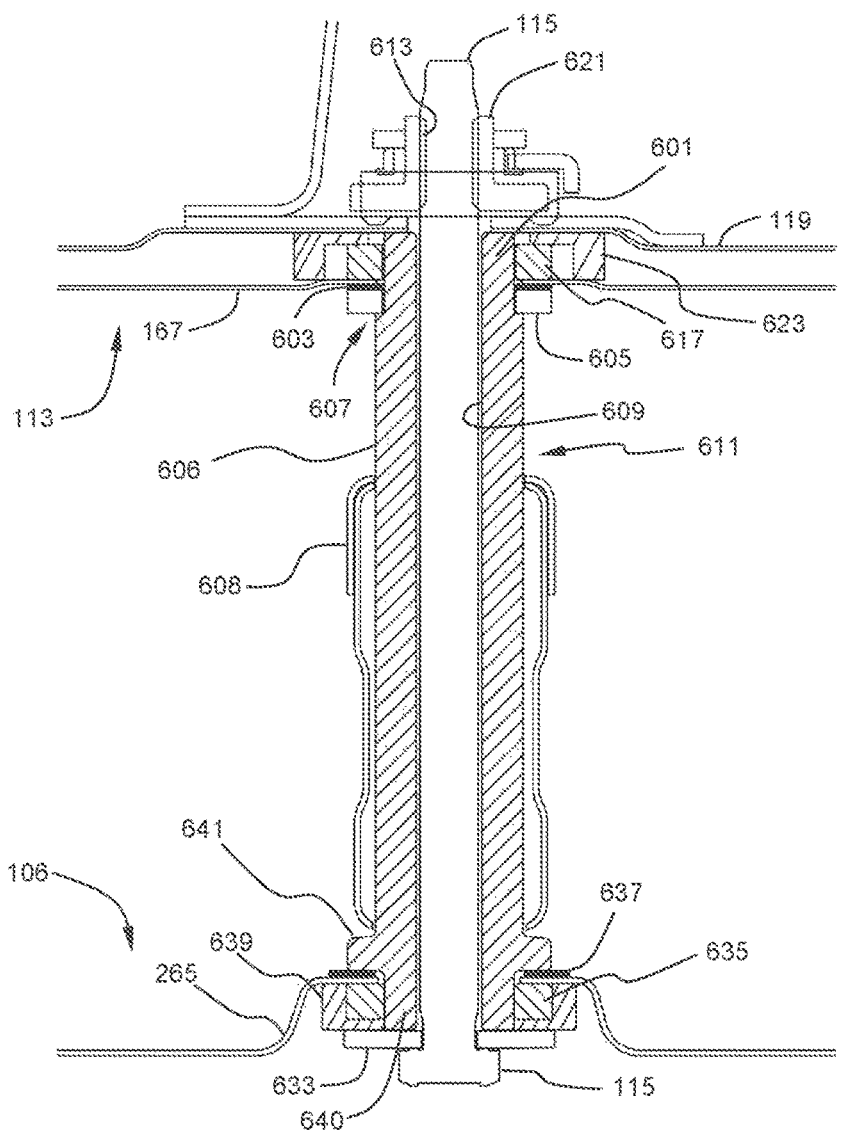
FIG. 6 illustrates a sectional view through an exemplary mounting stanchion and structural rail, in accordance with the present disclosure.

FIG. 6 illustrates an alternate embodiment of a stanchion 606 and its attachment and seal to wall 167 formed in upper cover 113 of battery pack 105. Stanchion 606 may extend through structural rail 608 and may be welded thereto. An interior portion 611 of the stanchion 606 is within the battery pack beneath wall 167. An exterior portion 601 of the stanchion 606 extends from the interior portion 611 through an opening in the wall 167. The stanchion 606 may include a bore 609 extending completely therethrough for passing an attachment bolt therethrough as further described herein. The stanchion 606 may include a shoulder 607 which may be sized larger than the opening in the wall 167. A washer 605 and gasket 603 may be captured between the shoulder 607 and the inner side of wall 167. Exterior portion 601 of stanchion 606 may include exterior threads for engaging nut 617. Nut 617 may be tightened to draw the wall 167 and stanchion together thereby compressing the wall 167 and the washer 605 and gasket 603 between the nut 617 and shoulder 607. A thread seal may be used at the nut 617 to exterior thread interface to prevent loosening and to seal any gas or liquid intrusions at the interface. A similar attachment and seal of stanchion 606 to wall 265 formed in lower tray 106 of battery pack 105 is also illustrated. Stanchion 606 may extend through structural rail 608 at the base thereof. The interior portion 611 of the stanchion 606 is within the battery pack above wall 265. An exterior portion 640 of the stanchion 606 extends from the interior portion 611 through an opening in the wall 265. The stanchion 606 may include a flange 641 which may be sized larger than the opening in the wall 265. A gasket 637 may be captured between the flange 641 and the inner side of wall 265. Exterior portion 640 of stanchion 606 may include exterior threads for engaging nut 635. Nut 635 may be tightened to draw the wall 265 and stanchion together thereby compressing the wall 265 and the gasket 637 between the nut 635 and flange 641. A thread seal may be used at the nut 635 to exterior thread interface to prevent loosening and to seal any gas or liquid intrusions at the interface. Such arrangement provides a seal of the interior of the battery pack 105 from the exterior thereof. Moreover, the assembly process may be readily reversed in the future when servicing the battery pack 105 is desired, for example at the end of useful life of the battery pack 105 or when the modular battery enclosures within the battery pack 105 are refreshed with new units during the service life of the battery electric vehicle. As is commonly practiced by vehicle original equipment manufacturers, the final assembly of vehicle may include receiving sub-assembled modules within the assembly plant for final assembly to the vehicles being produced. It is envisioned that the battery pack 105 as described herein may be manufactured off-site and received at the final assembly plant for integration with the battery electric vehicle. As such, it can be appreciated that the stanchion and seal assembly described herein enables final assembly and sealing of the battery pack which may be leak checked and tested, such as by pressure checking a completed battery pack, at the place of battery pack manufacture and assembly.

FIG. 6 additionally illustrates an embodiment of attachment of the battery pack 105, so constructed, to a battery pack attachment structure, for example to the automotive unibody structure 103 of the battery electric vehicle 101 as described herein. In one embodiment, the battery pack attachment structure may include the floor pan 119 of the automotive unibody structure 103. The floor pan may include an opening therethrough which in assembly alignment is substantially concentric with the opening in the wall 167 of the upper cover 113 of battery pack 105. In the present embodiment, the floor pan 119 bears against the end of exterior portion 601 of the stanchion 606. A seal may be provided between the floor pan 119 and the wall 167. The seal may be a compressible seal such as a gasket 623 as illustrated. The seal may be any other suitable seal including, for example a dispensed flexible polyurethane elastomer which is cured in place after assembly of the battery pack 105 to the floor pan 119. Such a secondary seal provides additional sealing of the battery pack 105 from the undesirable outside environmental contaminants which may be particularly aggressive in an automotive underbody environment. Similarly, a seal may be provided between a washer 633 and the wall 265. The seal may be a compressible seal such as a gasket 639 as illustrated. The seal may be any other suitable seal including, for example a dispensed flexible polyurethane elastomer which is cured in place after assembly of the battery pack 105 to the floor pan 119. Such a secondary seal provides additional sealing of the battery pack 105 from the undesirable outside environmental contaminants which may be particularly aggressive in an automotive underbody environment. Bolt 115 may be inserted from below as illustrated such that the head thereof engages the washer 633 and the opposite threaded end engages nut 621 which may be a weld nut. The bolt 115 may be tightened to draw the structures together and compress gaskets 623 and 639 to effect the desired seals. Alternatively, the bolt 115 may be inserted from above and engaged with a nut adjacent to the washer 633 and tightened to effect the desired seals.

Figure 7:
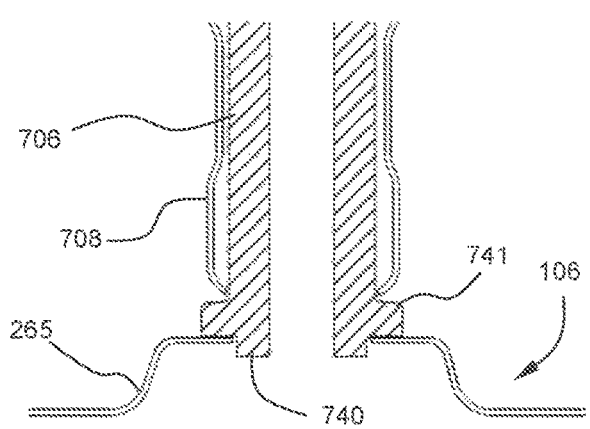
FIG. 7 illustrates a sectional view through a portion of an exemplary mounting stanchion and structural rail, in accordance with the present disclosure.
Figure 8:
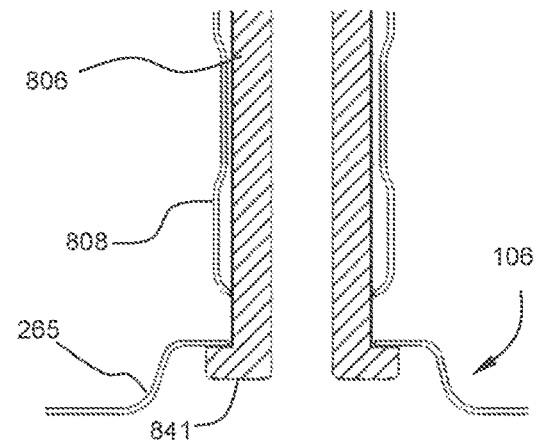
FIG. 8 illustrates a sectional view through a portion of an exemplary mounting stanchion and structural rail, in accordance with the present disclosure.

FIGS. 7 and 8 illustrate alternative embodiments of stanchion 606 and its attachment and seal to wall 265 formed in lower tray 106 of battery pack 105 wherein the stanchion 706 includes a bore completely therethrough. FIG. 7 illustrates stanchion 706 including a flange 741 sized larger than the opening though wall 265. Stanchion 706 may extend through structural rail 708 at the base thereof. Stanchion 706 includes an exterior portion 740 passing through the opening in wall 265. Stanchion 706 may be welded to wall 265 sufficient to establish structural attachment and a seal therebetween. Welding may be accomplished, for example, by spin welding. FIG. 8 illustrates stanchion 806 including a flange 841 sized larger than the opening though wall 265. Stanchion 806 may extend through structural rail 808 at the base thereof. Flange 841 is on the outside of wall 265. Stanchion 806 may be welded to wall 265 sufficient to establish structural attachment and a seal therebetween. Welding may be accomplished, for example, by spin welding.

Figure 9:
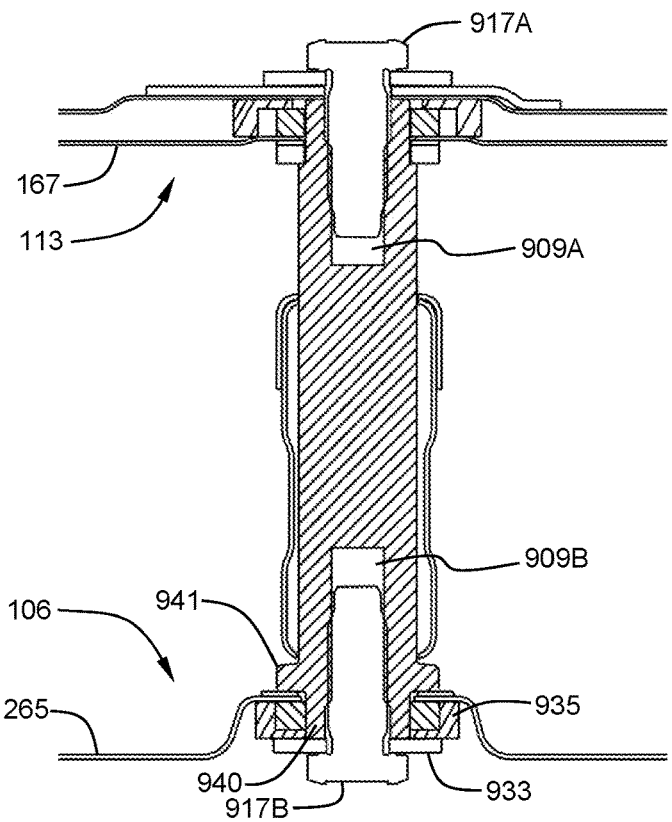
FIG. 9 illustrates a sectional view through a portion of an exemplary mounting stanchion and structural rail, in accordance with the present disclosure.
Figure 10:
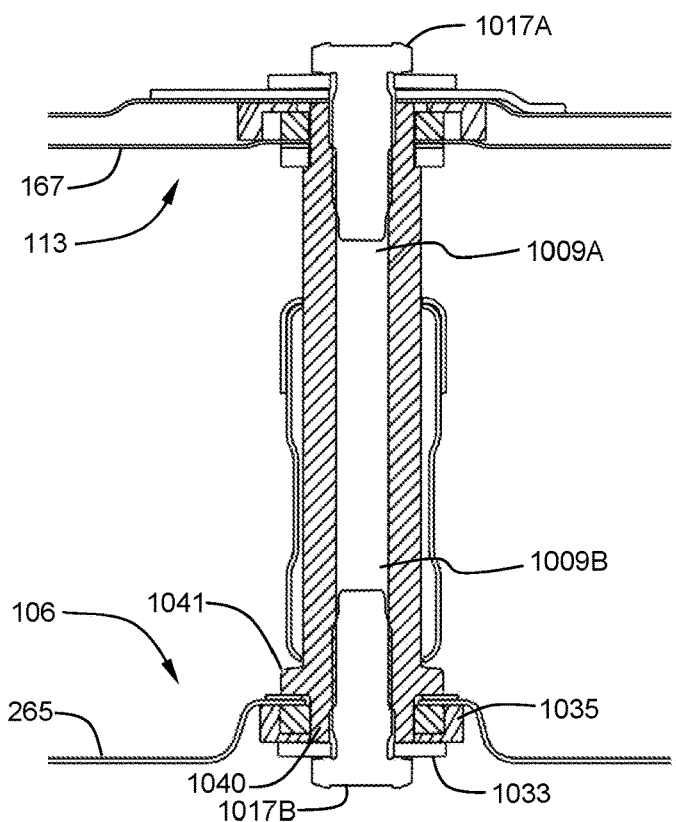
FIG. 10 illustrates a sectional view through a portion of an exemplary mounting stanchion and structural rail, in accordance with the present disclosure.

FIGS. 9 and 10 illustrate alternative embodiments of a stanchion and its attachment and seal to wall 167 formed in upper cover 113 and to wall 265 formed in lower tray 106 of a battery pack. FIGS. 9 and 10 illustrates the stanchion including a flange 941, 1041 sized larger than the opening though wall 265. The stanchion includes an exterior portion 940, 1040 passing through the opening in wall 265. The stanchion may include a first bore 909A, 1009A through at least a part of the first exterior portion and a first set of threads at the interior of the first bore 909A, 1009A, a second bore 909B, 1009B through at least a part of the second exterior portion and a second set of threads at the interior of the second bore 909B, 1009B. The threaded attachment fastener may include a first bolt 917A, 1017A extending through the battery pack attachment structure opening and engaging the first set of threads at the interior of the first bore 909A, 1009A to draw the stanchion and the battery pack attachment structure together. The system may include a seal 935, 1035 disposed between the outer side of the second enclosure wall 265 and a washer 933, 1033, and a second bolt 917B, 1017B extending through the washer and the second enclosure wall opening and engaging the second set of threads at the interior of the second bore 909B, 1009B.

FIGS. 9 and 10 illustrate alternative embodiments of a stanchion and its attachment and seal to wall 167 formed in upper cover 113 and to wall 265 formed in lower tray 106 of a battery pack.

Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements.

It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:

1. An attachment system for a serviceable battery pack, comprising:
    a battery pack comprising a first enclosure wall having a respective inner side, a respective outer side and defining a respective opening therethrough;
    a stanchion comprising an interior portion inside the battery pack and a first exterior portion extending from the interior portion through the first enclosure wall opening to outside the battery pack, the interior portion including a first flange larger than the first enclosure wall opening, the stanchion including a first set of threads on the first exterior portion;
    a first gasket trapped between the first flange and the inner side of the first enclosure wall;
    a first nut engaging the first set of threads and configured to compress the first enclosure wall between the first nut and the first flange;
    a battery pack attachment structure comprising a first surface facing the outer side of the first enclosure wall and defining a respective opening therethrough, the first enclosure wall opening and the battery pack attachment structure opening being substantially concentric;

a threaded attachment fastener configured to draw the stanchion and the battery pack attachment structure together; and a first seal disposed between the first enclosure wall and the battery pack attachment structure.

2. The system of claim 1, comprising:

the first seal disposed between the first enclosure wall and the battery pack attachment structure comprising a compressible gasket surrounding the first nut.

3. The system of claim 1, comprising:

the battery pack further comprising a second enclosure wall opposite to and spaced from the first enclosure wall and having a respective inner side, a respective outer side and defining a respective opening therethrough;

the stanchion further comprising a second exterior portion, the interior portion of the stanchion being intermediate the first and second exterior portions, the second exterior portion extending through the second enclosure wall opening to outside the battery pack, the interior portion including a second flange larger than the second enclosure wall opening, the stanchion further including a second set of threads on the second exterior portion;

a second gasket trapped between the second flange and the inner side of the second enclosure wall; and a second nut engaging the second set of threads and configured to compress the second enclosure wall between the second nut and the second flange.

4. The system of claim 1, comprising:

the stanchion further comprising a bore through at least a part of the first exterior portion and a set of threads at the interior of the bore; and the threaded attachment fastener comprising a bolt extending through the battery pack attachment structure opening and engaging the set of threads at the interior of the bore to draw the stanchion and the battery pack attachment structure together.

5. The system of claim 3, comprising:

the stanchion further comprising a bore through at least a part of the first exterior portion and a set of threads at the interior of the bore; and the threaded attachment fastener comprising a bolt extending through the battery pack attachment structure opening and engaging the set of threads at the interior of the bore to draw the stanchion and the battery pack attachment structure together.

6. The system of claim 3, comprising:

the stanchion further comprising a first bore through at least a part of the first exterior portion and a first set of threads at the interior of the first bore, a second bore through at least a part of the second exterior portion and a second set of threads at the interior of the second bore;

the threaded attachment fastener comprising a first bolt extending through the battery pack attachment structure opening and engaging the first set of threads at the interior of the first bore to draw the stanchion and the battery pack attachment structure together;

a second seal disposed between the outer side of the second enclosure wall and a washer; and a second bolt extending through the washer and the second enclosure wall opening and engaging the second set of threads at the interior of the second bore.

7. The system of claim 3, comprising:

the stanchion further comprising a longitudinal bore therethrough; and the threaded attachment fastener comprising a bolt having a head and an opposite threaded end, the bolt inserted completely through the stanchion bore and battery pack attachment structure opening and terminating at a third nut.

8. The system of claim 7, comprising:

the bolt inserted with the head proximate the second exterior portion of the stanchion; and the third nut proximate the first exterior portion of the stanchion.

9. The system of claim 7, comprising:

the bolt inserted with the head proximate the first exterior portion of the stanchion; and the third nut proximate the second exterior portion of the stanchion.

10. The system of claim 8, comprising:

a second seal disposed between the outer side of the second enclosure wall and a washer; and the washer disposed between the second seal and the head of the bolt.

11. The system of claim 1, comprising:

the battery pack further comprising a second enclosure wall opposite to and spaced from the first enclosure wall and having a respective inner side, a respective outer side and defining a respective opening therethrough;

the stanchion extending from the first exterior portion at least to the second enclosure wall, the stanchion further including a longitudinal bore therethrough substantially concentric with the second enclosure wall opening;

the stanchion sealably affixed to the second enclosure wall; and the threaded attachment fastener comprising a bolt having a head and an opposite threaded end, the bolt inserted completely through the stanchion bore, the battery pack attachment structure opening, the second enclosure wall opening, and terminating at a second nut.

12. An attachment system for a serviceable battery pack, comprising:

a battery pack comprising an enclosure wall having an inner side, an outer side and defining a respective opening therethrough;

a stanchion comprising an interior portion inside the battery pack and an exterior portion extending from the interior portion through the enclosure wall opening to outside the battery pack, the interior portion including a flange larger than the enclosure wall opening, the stanchion including a first set of external threads on the exterior portion and a second set of threads;

a gasket trapped between the flange and the inner side of the enclosure wall;

a first nut engaging the first set of external threads and configured to compress the enclosure wall between the first nut and the flange;

a battery pack attachment structure comprising a first surface facing the outer side of the enclosure wall and defining a respective opening therethrough, the enclosure wall opening and the battery pack attachment structure opening being substantially concentric;

a threaded attachment fastener engaging the second set of threads and configured to draw the stanchion and the battery pack attachment structure together; and a seal disposed between the enclosure wall and the battery pack attachment structure.

13. The system of claim 12, comprising:
the stanchion further comprising a bore through at least a part of the exterior portion, the second set of threads comprising internal threads at the interior of the bore; and
the threaded attachment fastener comprising a bolt extending through the battery pack attachment structure opening and engaging the second set of threads to draw the stanchion and the battery pack attachment structure together.

14. The system of claim 13, comprising:
the seal disposed between the enclosure wall and the battery pack attachment structure comprising a compressible gasket surrounding the first nut.

15. The system of claim 12, comprising:
the exterior portion of the stanchion further having a part thereof extending through the battery pack attachment structure opening;
the second set of threads comprising a portion of the first set of external threads on the part of the exterior portion extending through the battery pack attachment structure opening; and
the threaded attachment fastener comprising a second nut engaging the second set of threads and configured to compress the battery pack attachment structure between the second nut and the first nut.

16. The system of claim 12, comprising:
the exterior portion of the stanchion further having a part extending through the battery pack attachment structure opening, the part of the exterior portion extending through the battery pack attachment structure opening comprising a stepped diameter providing a shoulder;
the second set of threads comprising a second set of external threads on the part of the exterior portion extending through the battery pack attachment structure opening; and
the threaded attachment fastener comprising a second nut engaging the second set of threads and configured to compress the battery pack attachment structure between the second nut and the shoulder.

17. An attachment method for a serviceable battery pack, comprising:
providing a battery pack including a first enclosure wall having a respective inner side, a respective outer side and defining a respective opening therethrough;
providing a stanchion comprising an interior portion inside the battery pack and a first exterior portion extending from the interior portion through the first enclosure wall opening to outside the battery pack, the interior portion including a first flange larger than the first enclosure wall opening, the stanchion including a first set of threads on the first exterior portion;
providing a first gasket trapped between the first flange and the inner side of the first enclosure wall of the battery pack;
engaging the first set of threads with a first nut and compressing the first enclosure wall between the first nut and the first flange;
providing a battery pack attachment structure comprising a first surface facing the outer side of the first enclosure wall and defining a respective opening therethrough, the first enclosure wall opening and the battery pack attachment structure opening being substantially concentric;
providing a threaded attachment fastener configured to draw the stanchion and the battery pack attachment structure together; and
providing a first seal disposed between the first enclosure wall and the battery pack attachment structure.

18. The attachment method of claim 17, further comprising:
providing a bore through at least a part of the first exterior portion of the stanchion and a set of threads at the interior of the bore; and
wherein the threaded attachment fastener comprises a bolt extending through the battery pack attachment structure opening and engaging the set of threads at the interior of the bore to draw the stanchion and the battery pack attachment structure together.

* * * * *